US012802448B2

(12) United States Patent
Lipchin et al.

(10) Patent No.: US 12,802,448 B2
(45) Date of Patent: Nov. 17, 2026

(54) CLUSTERING AND ACTIVE LEARNING FOR TEACH-BY-EXAMPLE

(71) Applicant: MOTOROLA SOLUTIONS, INC., Chicago, IL (US)

(72) Inventors: Aleksey Lipchin, Newton, MA (US); Pietro Russo, Melrose, MA (US); Ron Wilson, Oceanside, CA (US); Kaveh Malakuti, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1214 days.

(21) Appl. No.: 17/202,818

(22) Filed: Mar. 16, 2021

(65) Prior Publication Data

US 2022/0301403 A1 Sep. 22, 2022

(51) Int. Cl.

| | |
|---|---|
| ***G06V 20/52*** | (2022.01) |
| ***G06F 18/21*** | (2023.01) |
| ***G06F 18/23213*** | (2023.01) |
| ***G06F 18/40*** | (2023.01) |
| ***G08B 13/196*** | (2006.01) |

(52) U.S. Cl.

CPC .......... *G06V 20/52* (2022.01); *G06F 18/2193* (2023.01); *G06F 18/23213* (2023.01); *G06F 18/41* (2023.01); *G08B 13/19645* (2013.01)

(58) Field of Classification Search

CPC .... G06V 20/52; G06V 10/764; G06V 10/778; G06V 40/103; G06V 10/762; G06F 18/2193; G06F 18/23213; G06F 18/41; G08B 13/19645

See application file for complete search history.

(56) References Cited

U.S. PATENT DOCUMENTS

| | | | | |
|---|---|---|---|---|
| 8,649,594 | B1 | 2/2014 | Hua et al. | |
| 8,934,709 | B2 | 1/2015 | Saptharishi et al. | |
| 9,742,435 | B1 * | 8/2017 | Poghosyan | H03M 7/3082 |
| 11,037,024 | B1 * | 6/2021 | Ratti | G06T 7/11 |
| 11,521,010 | B2 * | 12/2022 | Caesar | G06F 18/2113 |

(Continued)

FOREIGN PATENT DOCUMENTS

GB 2492248 A 4/2013

OTHER PUBLICATIONS

Lasecki, Walter S., et al. “Real-time crowd labeling for deployable activity recognition.” Proceedings of the 2013 conference on Computer supported cooperative work. 2013. (Year: 2013).*

(Continued)

*Primary Examiner* — Matthew Ell
*Assistant Examiner* — Blaine T Basom

(57) ABSTRACT

Clustering and active learning for teach-by-example, and methods therefor, are disclosed. One method includes clustering, at an at least one electronic processor: a plurality of first detections together as a first cluster based on each detection of the first detections corresponding to respective first image data being identified as potentially showing a first perceptible category of a plurality of perceptible categories; and a plurality of second detections together as a second cluster based on each detection of the second detections corresponding to respective second image data being identified as potentially showing a second perceptible category of the perceptible categories.

1 Claim, 8 Drawing Sheets

(56) References Cited

U.S. PATENT DOCUMENTS

| | | | | |
|---|---|---|---|---|
| 2014/0099034 | A1* | 4/2014 | Rafati | G06V 20/47 382/209 |
| 2018/0012463 | A1* | 1/2018 | Chaudhry | G06T 7/246 |
| 2019/0391578 | A1* | 12/2019 | Tariq | G06N 7/01 |
| 2020/0226431 | A1* | 7/2020 | Zeiler | G06F 18/2431 |
| 2020/0320665 | A1* | 10/2020 | Eswara | G06T 7/90 |
| 2021/0014575 | A1* | 1/2021 | Selfors | G09B 19/06 |
| 2021/0081822 | A1* | 3/2021 | Davidson | G06V 10/7715 |
| 2021/0279470 | A1* | 9/2021 | Zadeh | G06F 11/327 |
| 2022/0058394 | A1* | 2/2022 | Tang | G08B 13/19686 |

OTHER PUBLICATIONS

S. Harous, M. A. Harmoodi and H. Biri, "A Comparative Study of Clustering Algorithms for Mixed Datasets," 2019 Amity International Conference on Artificial Intelligence (AICAI), Dubai, United Arab Emirates, 2019, pp. 484-488, doi: 10.1109/AICAI.2019.8701347.

Zalán Bodó, Zsolt Minier, Lehel Csató ; Active Learning and Experimental Design workshop In conjunction with AISTATS 2010, JMLR Workshop and Conference Proceedings 16:127-139, 2011.

Bian, Jiang, Dayong Tian, Yuanyan Tang and D. Tao. "A survey on trajectory clustering analysis." ArXiv abs/1802.06971 (2018): n. all pages.

A. Abdullin and O. Nasraoui, "Clustering Heterogeneous Data Sets," 2012 Eighth Latin American Web Congress, Cartagena de Indias, 2012, pp. 1-8, doi: 10.1109/LA-WEB.2012.27.

* cited by examiner

CLUSTERING AND ACTIVE LEARNING FOR TEACH-BY-EXAMPLE

BACKGROUND

Computer-implemented visual object detection, also called object recognition, pertains to locating and classifying visual representations of real-life objects found in still images or motion videos captured by a camera. By performing visual object detection, each visual object found in the still images or motion video is classified according to its type (such as, for example, human, vehicle, or animal).

Automated security systems typically employ video cameras and/or other image capturing devices or sensors to collect image data such as video. Images represented by the image data may be displayed for contemporaneous screening by security personnel and/or recorded for later review after a security breach. Computer-implemented visual object detection can greatly assist security personnel and others in connection with these sorts of activities.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
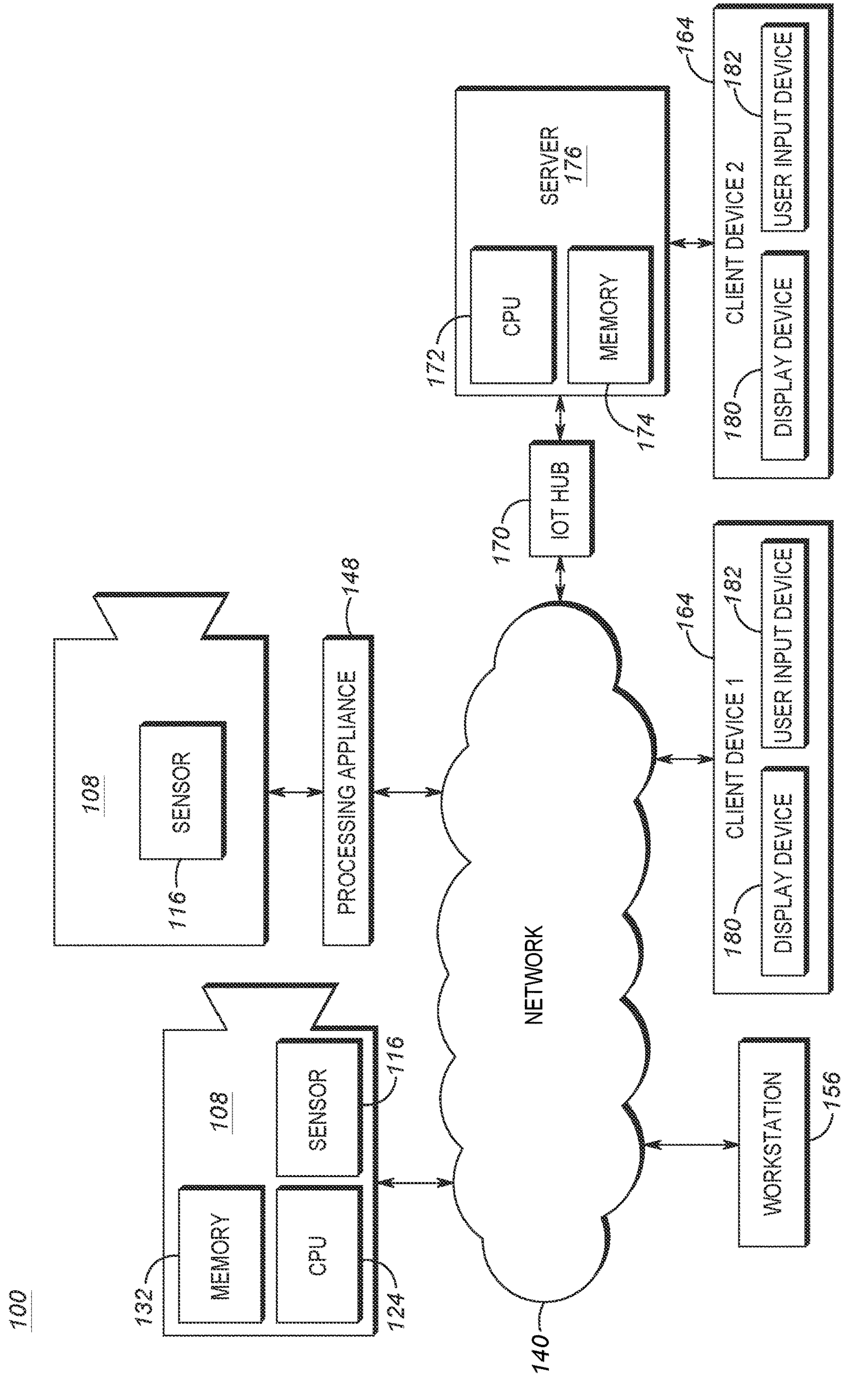
FIG. 1 is a block diagram of connected devices of a video capture and playback system according to an example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a method that includes clustering, at an at least one electronic processor, a plurality of first detections together as a first cluster based on each detection of the first detections corresponding to respective first image data being identified as potentially showing a first perceptible category of a plurality of perceptible categories. A plurality of second detections are clustered together as a second cluster based on each detection of the second detections corresponding to respective second image data being identified as potentially showing a second perceptible category of the perceptible categories. The method also includes assigning, at the at least one electronic processor, first and second review priority levels to the first and second clusters respectively, wherein the first review priority level is higher than the second review priority level. While the second cluster remains in a review queue that orders future reviewing, representative images or video of the first cluster are presented on a display. The method also includes receiving, at the at least one electronic processor, annotation input from a user that instructs at least some of the first detections to be digitally annotated as: i) a true positive for the first perceptible category; or ii) a false positive for the first perceptible category.

Optionally, the method may further include operating at least one video camera to capture video, which includes at least one of the first image data and second image data, at a first security system site having a first geographic location, and wherein the display may be located at a second security system site at a second geographic location that is different from the first geographic location.

Optionally, the at least one electronic processor may be a plurality of processors including a first processor within a cloud server and a second processor within the second security system site.

Optionally, the first detections may be related to each other based on at least one detected object characteristic, which may be at least one of the following: detected object type, detected object size, detected object bounding box aspect ratio, detected object bounding box location, and confidence of detection.

In accordance with another example embodiment, there is provided a method that includes bundling, at an at least one electronic processor, a plurality of stored video clips together based on each video clip of the stored video clips, that includes a respective at least one object detection, being identified as potentially showing a first perceptible category of a plurality of perceptible categories. The method also includes generating, at the at least one electronic processor, a plurality of visual selection indicators corresponding to the stored video clips to be presented to a user on a display, each of the visual selection indicators operable to initiate playing of a respective one of the stored video clips. The method also includes receiving, at the at least one electronic processor, annotation input from the user that instructs each of the stored video clips to be digitally annotated as: i) a true positive for the first perceptible category; or ii) a false positive for the first perceptible category. The method also includes changing, at the at least one electronic processor and based on the annotation input, criteria by which non-annotated detections are assigned or re-assigned to respective clusters.

Optionally, the method may further include determining, at the at least one electronic processor and after the receiving of the annotation input, that one of the stored video clips shows a non-alarm event.

Optionally, the method may further include operating at least one video camera to capture video, corresponding to the video clips, at a first security system site having a first geographic location, and wherein: the display may be located at a second security system site at a second geographic location that is different from the first geographic location; and within the video clips one or more objects or one or more portions thereof may be redacted by the at least one electronic processor based on privacy requirements.

In accordance with yet another example embodiment, there is provided a system that includes a display device, at least one user input device, and an at least one electronic processor in communication with the display device and the at least one user input device. The at least one electronic processor is configured to bundle a plurality of stored video clips together based on each video clip of the stored video clips, that includes a respective at least one object detection, being identified as potentially showing a first perceptible category of a plurality of perceptible categories. The at least one electronic processor is also configured to generate a plurality of visual selection indicators corresponding to the stored video clips to be presented to a user on the display device. Each of the visual selection indicators are operable to initiate playing of a respective one of the stored video clips. The at least one electronic processor is also configured to receive, from the at least one user input device, annotation input from the user that instructs each of the stored video clips to be digitally annotated: i) a true positive for the first perceptible category; or ii) a false positive for the first perceptible category. The at least one electronic processor is also configured to change, based on the annotation input, criteria by which non-annotated detection are assigned or re-assigned to respective clusters.

Each of the above-mentioned embodiments will be discussed in more detail below, starting with example system and device architectures of the system in which the embodiments may be practiced, followed by an illustration of processing blocks for achieving an improved technical method, device, and system for teach-by-example clustering.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, other entities, etc.

The term "clustering" as used herein refers to the logical organizing of detections together based one or more similarities that have been calculated to exist as between detections that may fall within a same cluster.

The term "bundling" as used herein refers to at least one video clip (or alternatively at least one static image, where instead of video such alternative form of media is displayed to a user) that is presented together in some visual manner to facilitate contemporaneous review and annotation on a display, by a human user, of the at least one video clip (or static image).

Further advantages and features consistent with this disclosure will be set forth in the following detailed description, with reference to the figures.

Referring now to the drawings, and in particular FIG. 1, therein illustrated is a block diagram of connected devices of a video capture and playback system 100 according to an example embodiment. For example, the video capture and playback system 100 may be installed and configured to operate as a video security system. The video capture and playback system 100 includes hardware and software that perform the processes and functions described herein.

The video capture and playback system 100 includes a video capture device 108 being operable to capture a plurality of images and produce image data representing the plurality of captured images. The video capture device 108 or camera 108 is an image capturing device and includes security video cameras.

Each video capture device 108 includes an image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The image sensor 116 may be operable to capture light in one or more frequency ranges. For example, the image sensor 116 may be operable to capture light in a range that substantially corresponds to the visible light frequency range. In other examples, the image sensor 116 may be operable to capture light outside the visible light range, such as in the infrared and/or ultraviolet range. In other examples, the video capture device 108 may be a multi-sensor camera that includes two or more sensors that are operable to capture light in same or different frequency ranges.

The video capture device 108 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a security camera, such as any one of a pan-tilt-zoom camera, dome camera, in-ceiling camera, box camera, and bullet camera.

Additionally, or alternatively, the video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes a processor 124, a memory device 132 coupled to the processor 124 and a network interface. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the video capture device 108 may be implemented together within a system on a chip (SOC). For example, the processor 124, the memory device 132 and the network interface may be implemented within a SOC. Furthermore, when implemented in this way, a general purpose processor and one or more of a GPU or VPU, and a DSP may be implemented together within the SOC.

Continuing with FIG. 1, each of the video capture devices 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one example embodiment, and as illustrated in FIG. 1, the video capture and playback system 100 includes a workstation 156, each having one or more processors including graphics processing units (GPUs). The workstation 156 may also include storage memory. The workstation 156 receives image data from at least one video capture device 108 and performs processing of the image data. The workstation 156 may further send commands for managing and/or controlling one or more of the video capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data. The received metadata may include, inter alia, object detection and classification information.

It will be understood that while a single workstation 156 is illustrated in FIG. 1, the workstation may be implemented as an aggregation of a plurality of workstations.

FIG. 1 also depicts a server 176 that is communicative with the cameras 108, processing appliance 148, and workstation 156 via the network 140 and an Internet-Of-Things hub 170 ("IOT hub"). The server 176 may be an on-premises server or it may be hosted off-site (such as, for example, a public cloud). The server 176 comprises one or more processors 172, one or more memory devices 174 coupled to the one or more processors 172, and one or more network interfaces. As with the cameras 108, the memory device 174 can include a local memory (such as, for example, a random access memory and a cache memory) employed during execution of program instructions. The processor 172 executes computer program instructions (such as, for example, an operating system and/or application programs), which can be stored in the memory device 174. In at least some example embodiments, circuitry or other implementations of the processor 124 and memory device 132 of the cameras 108 may also be used for the processor 172 and memory device 174 of the server 176. In at least some example embodiments, the IOT hub 170 is a cloud-hosted, managed service that bi-directionally connects the server 176 to the rest of the network 140 and the devices connected to it, such as the camera 108. The IOT hub 170 may, for example, comprise part of the Microsoft™ Azure™ cloud computing platform, and the server 176 may accordingly be cloud-hosted using the Microsoft™ Azure™ platform. Different example embodiments are possible. For example, the IOT hub 170 may be replaced with one or more of an Ethernet hub, router, and switch (managed or unmanaged), regardless of whether the server 176 is cloud-hosted. The server 176 may additionally or alternatively be directly connected to any one or more of the other devices of the video capture and playback system 100. Further, while use of the IOT hub 170 implies that the server 176 is networked to a large number of Internet-connected computing appliances, this may be the case in certain embodiments and not in others. For example, the video capture and playback system 100 may comprise a very large number of the cameras 108; alternatively, the video capture and playback system 100 may comprise only a handful of cameras 108 and other network-connected devices or appliances, and the IOT hub 170 may nonetheless still be used.

Any one or more of the cameras 108, processing appliance 148, and workstation 156 may act as edge devices that communicate with the server 176 via the network 140 and IOT hub 170. Any of the edge devices may, for example, perform initial processing on captured video and subsequently send some or all of that initially processed video to the server 176 for additional processing. For example, the camera 108 may apply a first type of video analytics to analyze video captured using the camera 108 to detect an object and/or alternatively identify an event which triggers a video alarm (based at least in part on the occurrence of, for example, one or more detections that are based on object features). Subsequent to such detection and/or event identification, the camera 108 may, for example, generate a video clip of a certain duration that includes that video alarm (or one or more detections). The camera 108 may then send the video clip and related metadata to the server 176 for more robust processing using a second type of video analytics that requires more computational resources than the first type of video analytics and that is accordingly unsuitable for deployment on the camera 108. Alternatively, the video capture and playback system 100 may operate such that video clips are not transmitted from the camera 108 to the server 176, but instead detections and related metadata are transmitted from the camera 108 to the server 176 for more robust processing based on analogous considerations and principles. In accordance with at least some example embodiments, it is contemplated that the video clip, detections and/or related metadata are stored as training data for later use in connection with clustering and teach-by-example methods consistent with the example embodiments herein described.

The video capture and playback system 100 further includes a pair of client devices 164 connected to the network 140 (two shown for purposes of illustration; however any suitable number is contemplated). In FIG. 1, a first client device 164 is connected to the network 140, and a second client device 164 is connected to the server 176. The client device 164 is used by one or more users to interact with the video capture and playback system 100. Accordingly, the client device 164 includes a display device 180 and a user input device 182 (such as, for example, a mouse, keyboard, or touchscreen). The client device 164 is operable to display on its display device a user interface for displaying information, receiving user input, and playing back video. For example, the client device may be any one of a personal computer, laptop, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 156 and one or more client devices 164.

In some examples, the image capture and playback system 100 may be implemented without the workstation 156 and/or the server 176. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
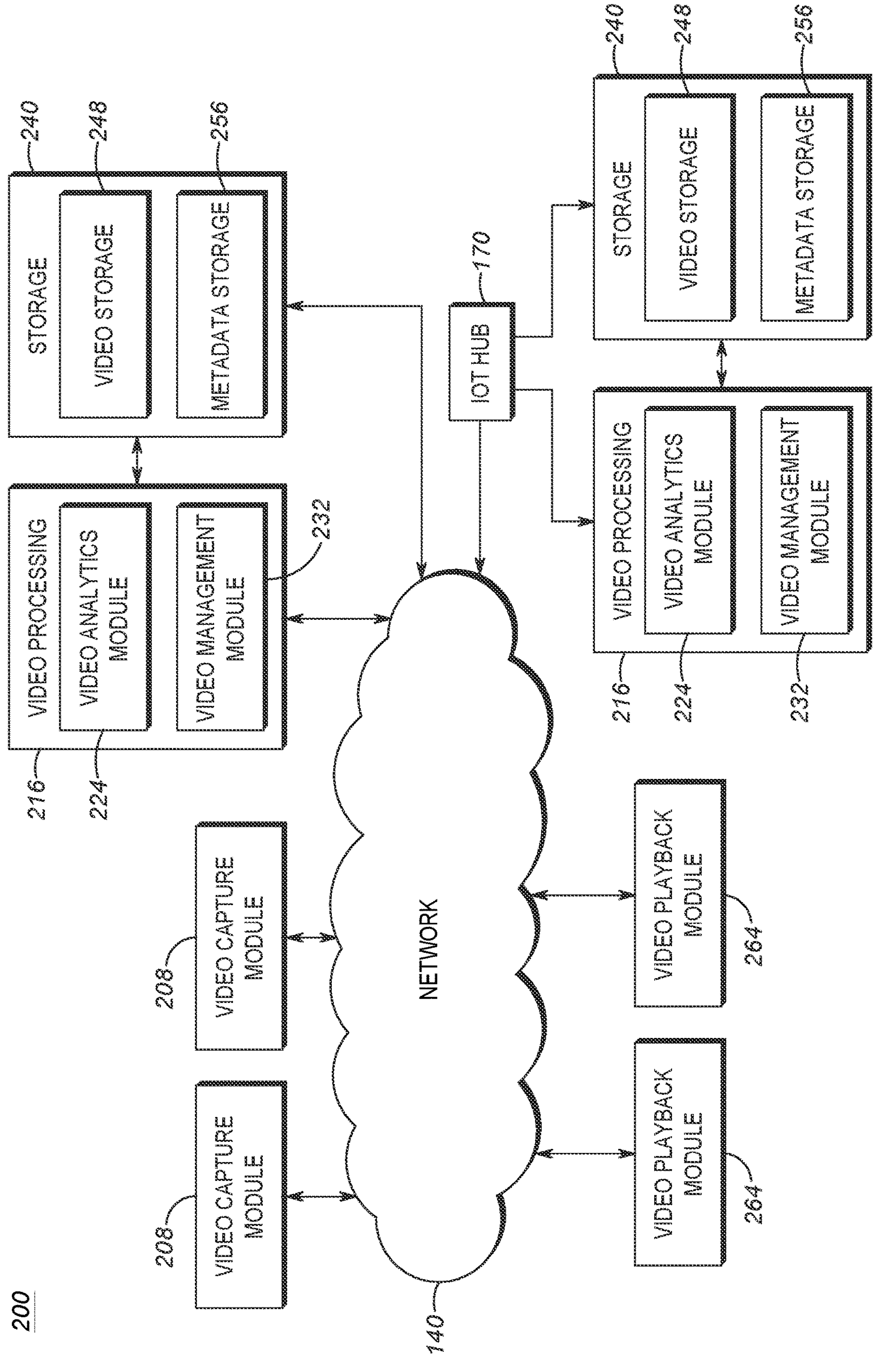
FIG. 2A is a block diagram of a set of operational modules of the video capture and playback system according to an example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules includes video capture modules 208 (two shown for purposes of illustration; however any suitable number is contemplated). For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video, of objects found in the scene represented by the image or video, and/or of video alarms found in the scene represented by the video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics module 224. The video analytics module 224 may include one or more neural networks (for example, one or more convolutional neural networks) to implement artificial intelligence functionality. The size, power and complexity of these neural networks may vary based on factors related to design choice such as, for example, where the neural network will reside. For instance, a neural network residing on the video capture device 108 may be smaller and less complex than a neural network residing in the cloud.

Continuing on, the video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224. Also, it is contemplated that training data as herein described may be stored in suitable storage device(s). More specifically, image and/or video portions of the training data may be stored in the video storage module 248, and metadata portions of the training data may be stored in the metadata storage module 256.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes video playback modules 264 (two shown for purposes of illustration; however any suitable number is contemplated), which are operable to receive image data and playback the image data as a video. For example, the video playback module 264 may be implemented on a client device 164.

The operational modules of the set 200 may be implemented on one or more of the video capture device 108, processing appliance 148, workstation 156, server 176, and client device 164. In some example embodiments, an operational module may be wholly implemented on a single device. For example, the video analytics module 224 may be wholly implemented on the workstation 156. Similarly, the video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between two or more of the video capture device 108, processing appliance 148, server 176, and workstation 156. Similarly, video management functionalities may be split between two or more of a video capture device 108, processing appliance 148, server 176, and workstation 156.

Figure 2B:
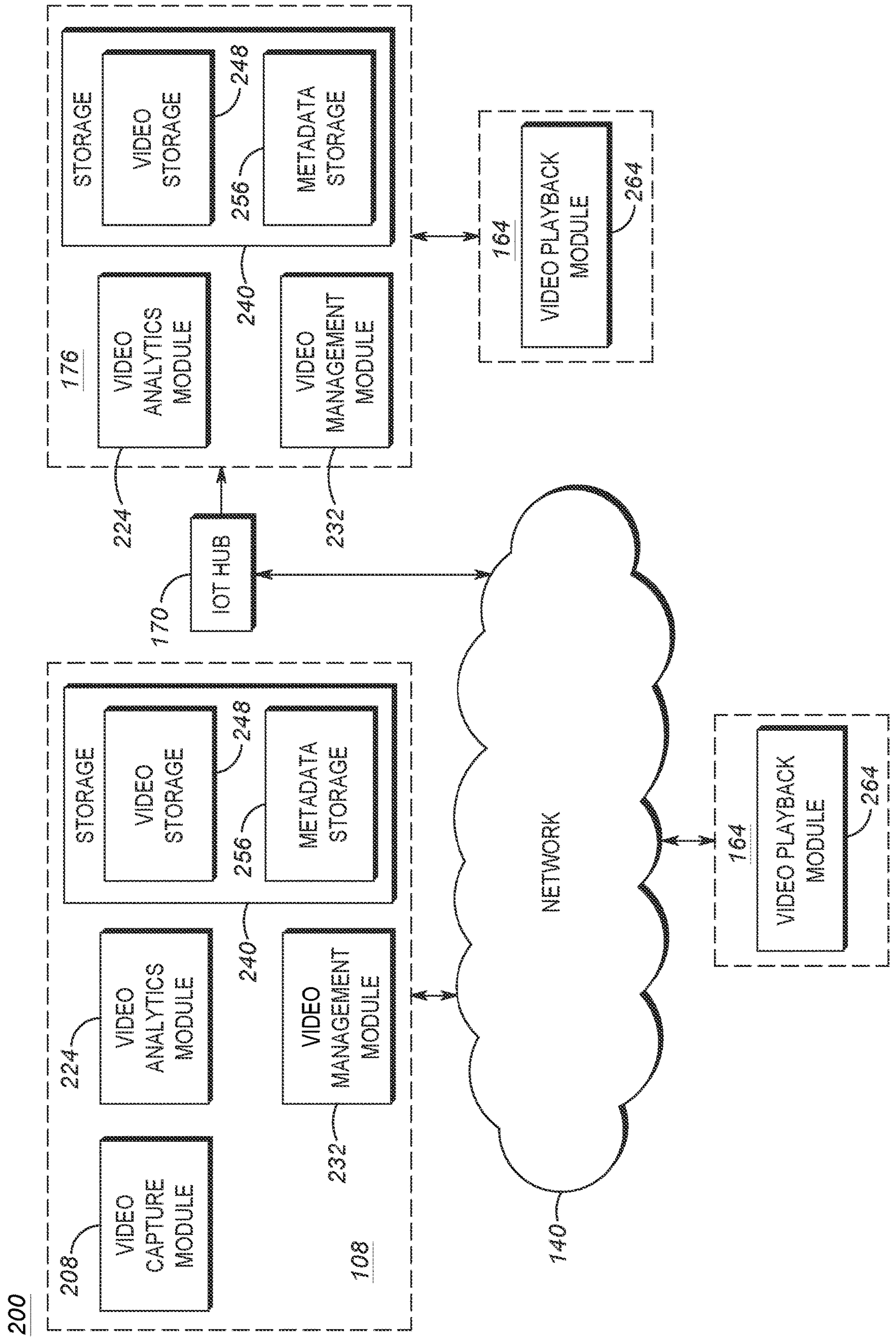
FIG. 2B is a block diagram of a set of operational modules of the video capture and playback system according to one particular example embodiment in which a video analytics module, a video management module, and storage are wholly implemented on each of a video capture device and a server.

Referring now to FIG. 2B, therein illustrated is a block diagram of a set 200 of operational modules of the video capture and playback system 100 according to one particular example embodiment in which the video analytics module 224, the video management module 232, and the storage 240 is wholly implemented on each of the camera 108 and the server 176. The video analytics module 224, the video management module 232, and the storage 240 may additionally or alternatively be wholly or partially implemented on one or more processing appliances 148. The video playback module 264 is implemented on each of the client devices 164, thereby facilitating playback from either device. As mentioned above in respect of FIG. 1, the video analytics implemented on the camera 108 and on the server 176 may complement each other. For example, the camera's 108 video analytics module 224 may perform a first type of video analytics, and send the analyzed video or a portion thereof to the server 176 for additional processing by a second type of video analytics using the server's 176 video analytics module 224.

It will be appreciated that allowing the subset 216 of image data (video) processing modules to be implemented on a single device or on various devices of the video capture and playback system 100 allows flexibility in building the video capture and playback system 100.

For example, one may choose to use a particular device having certain functionalities with another device lacking those functionalities. This may be useful when integrating devices from different parties (such as, for example, manufacturers) or retrofitting an existing video capture and playback system.

Typically, limited processing power is available on board the camera 108 (or other local processing device). The detections and video alarms that may be generated by the video analytics module 224 of the camera 108 (or other local processing device) accordingly are subject to, in at least some example embodiments, errors in the form of a material number of false positives (for example, detecting an object when no object is present, false alarm, etcetera).

All detections are clustered (true and false positives). For each cluster, bundles are identified (as subsets of each cluster). While the user provides answers for bundles, the user answers are extended for a particular bundle to a whole cluster and/or a re-clustering of detections (new bundles can also be re-identified after these clustering-related activities occur). In this manner, initial bundling (and clustering) may not be the only important consideration for teach-by-example, re-bundling (and re-clustering) may also be an important consideration.

Also, in accordance with at least one example embodiment, the video analytics module 224 selects detection clusters to be presented to the user in a manner that attempts to balance false positive representative examples and true positive representative examples. Also, clustering can be based on, for example, one or more of the following features: trajectory, time, location, detected object size, aspect ratio of the bounding box, shape of the object (if object segmentation is available), confidence of detection, some other feature.

As should be understood from what has already been previously herein mentioned, clustering is both practically and conceptually different from bundling. Bundles may be formed such that not all (or even many) detections from amongst all of those that belong to a particular larger sized cluster are included as part of the particular bundle presented to the user. (Also, clustering is more likely, as compared to bundling, to be independent of video analytic rules.)

It is contemplated that only a few detections (or even just one detection) may be included in one particular bundle, and then the user label may be extended from the few or small number of detections or alarms to all members of the same perceptible category, thereby allowing the labeling of more detections or alarms using user input that is limited by the time and effort that the user is willing to spend on annotating.

Based on user annotation of false positives and true positives, extended across to all members of the applicable perceptible categories, a classifier of the video analytics module 224 can be trained. (A decision tree is one example of a classifier.) In at least some examples, this classifier may provide additional filtering of false positive detections.

In some examples where a classifier is implemented, the classifier is configured to filter out at least some false positives (function as a filter that the video capture and playback system 100 uses to process object detections and/or video alarms prior to displaying them to a user). The classifier (for example, a decision tree) may be implemented on, for example, on the server 176 (although it could also be implemented on the client device 164, processing appliance 148, and/or workstation 156).

The annotating process that facilitates training of the classifier may be manual. For example, a user may provide annotation input which marks a certain number of detections and/or video alarms as being correct (a "positive example"), or as being incorrect (a "negative example"), and then the positive and negative examples are used to train the classifier. The user may, for example, mark some suitable number of positive examples and a same or different suitable number of negative examples (exact number of examples or numerical range of examples can vary from one implementation to the next). Conventionally speaking, to reach a good accuracy of classification, the user may be expected to annotate a lot of detections, which results in a time-consuming process. Also it will be appreciated that, in the conventional approach, the user may be given a large degree of freedom in choosing what detections are annotated, and consequently it is quite likely that the choices made by the user do not representatively reflect the real distribution of detections. For example, the user in the conventional approach may ignore the detections in one area of the camera view, and thus only annotate detections in some other area of the view. Using AI approaches as clustering and active learning based on representativeness of the data may facilitate minimization of the amount of detection annotation and optimize the choice of detections to be annotated in respect to the classifier accuracy.

Positive and negative training data generated according to example embodiments herein may be used to train any suitable machine learning classifier that may use such examples for training. For instance, instead of being used to train a decision tree, the examples may be used to train support vector machines, neural networks, and logistic regression classifiers.

In accordance with some example embodiments, the artificial intelligence and machine learning (within, for example, the video analytics module 224) operate in smart manner to prioritize which clusters of detections are presented to the user in connection with human-machine cooperative teach-by-example. In this regard, reference is now made to FIG. 3.

Figure 3:
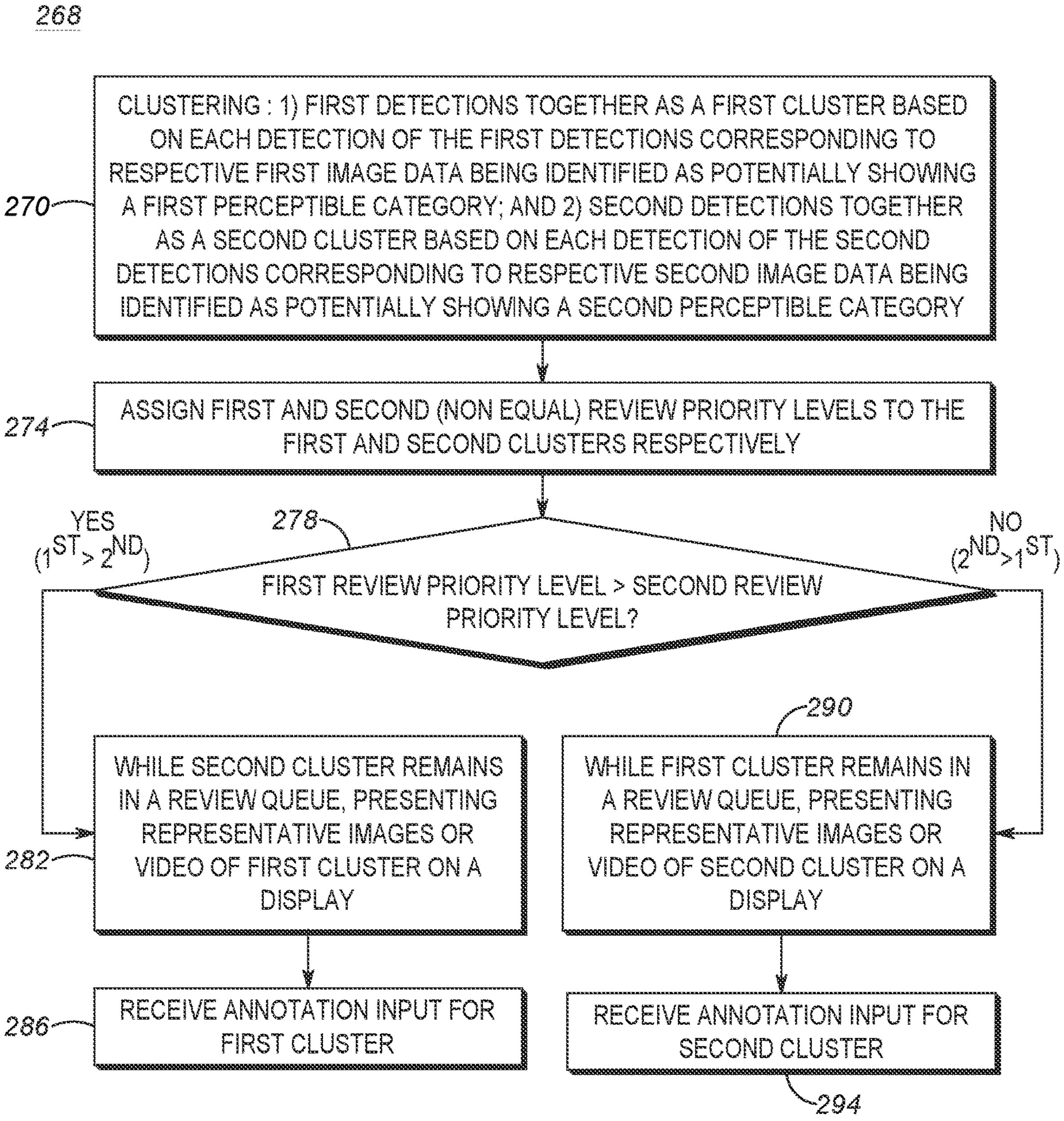
FIG. 3 is a flow chart illustrating a computer-implemented method of prioritizing clusters in connection with obtaining user annotation input in accordance with an example embodiment.

FIG. 3 is a flow chart illustrating a computer-implemented method 268 of prioritizing clusters in connection with obtaining user annotation input in accordance with an example embodiment. The illustrated computer-implemented method 268 includes clustering (270): 1) a plurality of first detections together as a first cluster based on each detection of the first detections corresponding to respective first image data being identified as potentially showing a first perceptible category of a plurality of perceptible categories; and 2) a plurality of second detections together as a second cluster based on each detection of the second detections corresponding to respective second image data being identified as potentially showing a second perceptible category of the perceptible categories. (It will be understood that two clusters are explicitly mentioned in this example embodiment for convenience of illustration; however the method 268 applies to any suitable number of clusters.)

Next, the computer-implemented method 268 includes assigning (274) first and second (nonequal) review priority levels to the first and second clusters respectively. (Extending this beyond the simplest example of first and second clusters, if there is a third cluster then this would be assigned a third priority review level, if there is a fourth cluster then this would be assigned a fourth priority review level, etcetera.)

Next is decision action 278. If the first review priority level is higher than the second review priority level, action 282 follows. Alternatively, if the second review priority level is higher than the first review priority level, action 290 follows.

If "YES" follows from the decision action 278, then, while the second cluster remains in a review queue that orders future reviewing, representative images or video of the first cluster are displayed (740) such as, for example, on the display device 180 or other display device attached to or integrated with the client device 164 or the workstation 156 of FIG. 1.

Following the action 282, annotation input is received (286) from the user that instructs at least some of the first detections to be digitally annotated as: i) a true positive for the first perceptible category; or ii) a false positive for the first perceptible category.

Now as an alternative to "YES" following from the decision action 278, "NO" may instead follow from the decision action 278. In such case, then, while the first cluster remains in a review queue that orders future reviewing, representative images or video of the second cluster are displayed (290) such as, for example, on the display device 180 or other display device attached to or integrated with the client device 164 or the workstation 156 of FIG. 1.

Following the action 290, annotation input is received (294) from the user that instructs at least some of the second detections to be digitally annotated as: i) a true positive for the first perceptible category; or ii) a false positive for the first perceptible category.

Figure 4:
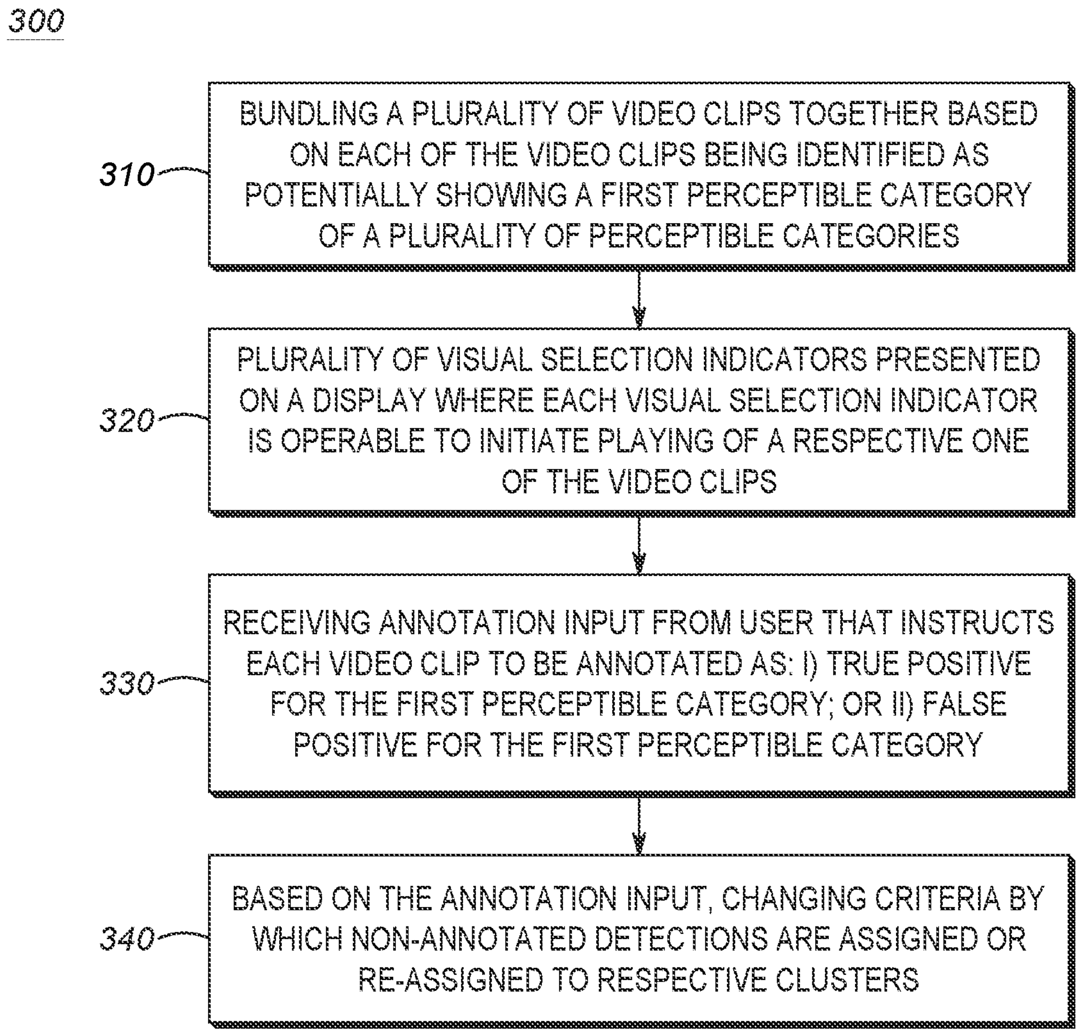
FIG. 4 is a flow chart illustrating a computer-implemented method of bundling a plurality of video clips in connection with obtaining user annotation input in accordance with an example embodiment.

Reference is now made to FIGS. 4 to 7. FIG. 4 is a flow chart illustrating a computer-implemented method 300 of bundling a plurality of video clips in connection with obtaining user annotation input in accordance with an example embodiment. The illustrated computer-implemented method 300 includes bundling (310) a plurality of stored video clips together based on each video clip of the stored video clips (that includes a respective at least one object detection) being identified as potentially showing a first perceptible category of a plurality of perceptible categories. The bundling (310) is carried out at an at least one electronic processor (such as, for example, any one or more of the CPU 172 and any other suitable electronic processor of the video capture and playback system 100 of FIG. 1). The perceptible categories may include, for example, human detection, vehicle detection, other categorizations of individual or combined object detection(s), object left behind alarm, object removed alarm, other categorizations of alarms, etcetera.

In terms of the size of video clip bundles, the number of video clips per bundle can be any suitable integer number greater than zero (similarly, clusters can be any suitable integer number greater than zero). It is also contemplated that bundle size may change from one stage of the user annotation process to the next. For example, re-bundled video clips may be put into a bundle that is larger or smaller than respective original bundle(s) to which those video clips belonged. Also, since a particular bundle to be presented to a user may be a fixed number with respect to which there may more than such number of video clips in the perceptible category available to be selected for inclusion in the bundle, the CPU 172 (or some other electronic processor running the applicable computer executable instructions) may selectively choose a subset of the video clips for the bundle based on predetermined factors such as, for example, uniqueness of the particular video clip, duration of the video clip, etcetera.

Continuing on, the computer-implemented method 300 includes generating (320), at an at least one electronic processor (such as, for example, any one or more of the CPU 172 and any other suitable electronic processor of the video capture and playback system 100 of FIG. 1) a plurality of visual selection indicators corresponding to the stored video clips to be presented to a user on a display (such as, for example, the display device 180 or other display device attached to or integrated with the client device 164 or the workstation 156 of FIG. 1) where each of the visual selection indicators is operable to initiate playing of a respective one of the stored video clips.

In connection with initiating the playing as described above, the stored video clips may be retrieved from, for example, the storage 240. It will also be understood that a federated approach is contemplated (for instance, in connection with a cloud storage example embodiment). Where a federated approach is carried out across a number of video security sites of unrelated entities (for example, different customers), certain objects or portions thereof may be redacted to protect privacy.

Figure 5:
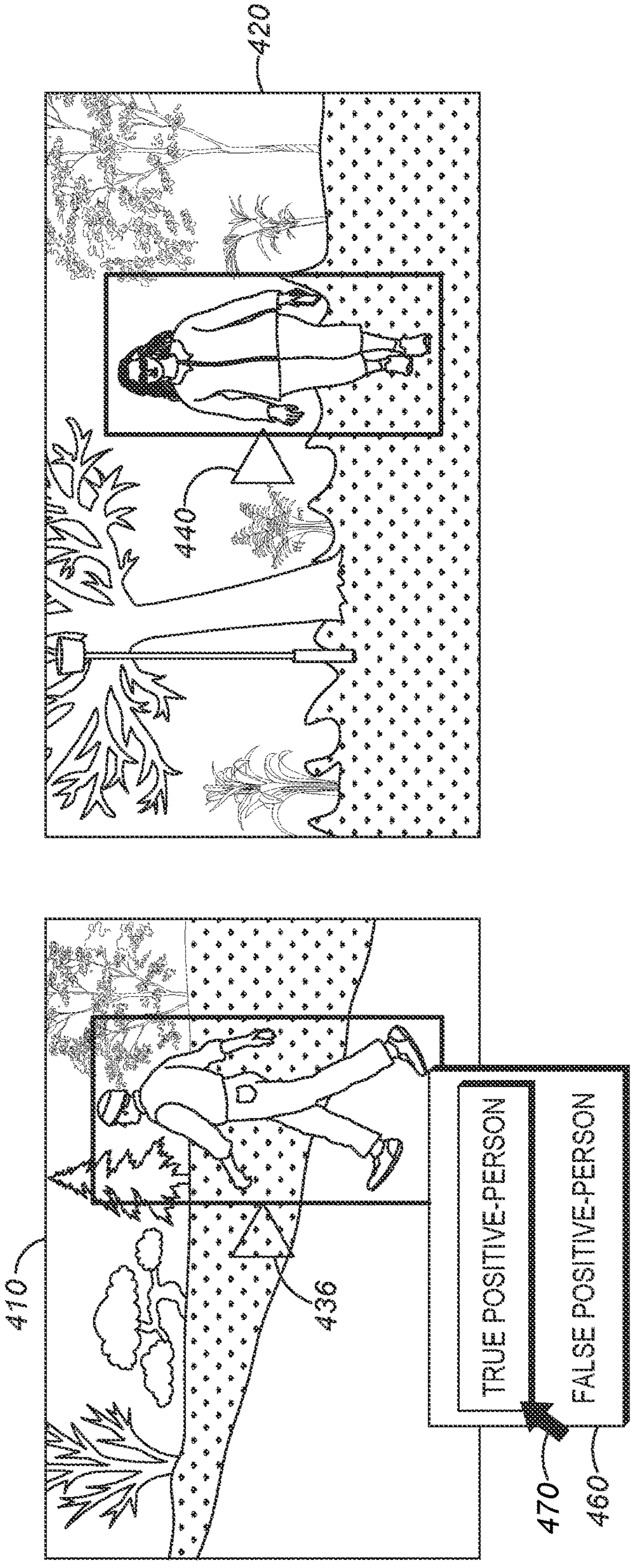
FIG. 5 is a diagram illustrating a first example user interaction with a representation of a playable video clip in accordance with an example embodiment.
Figure 6:
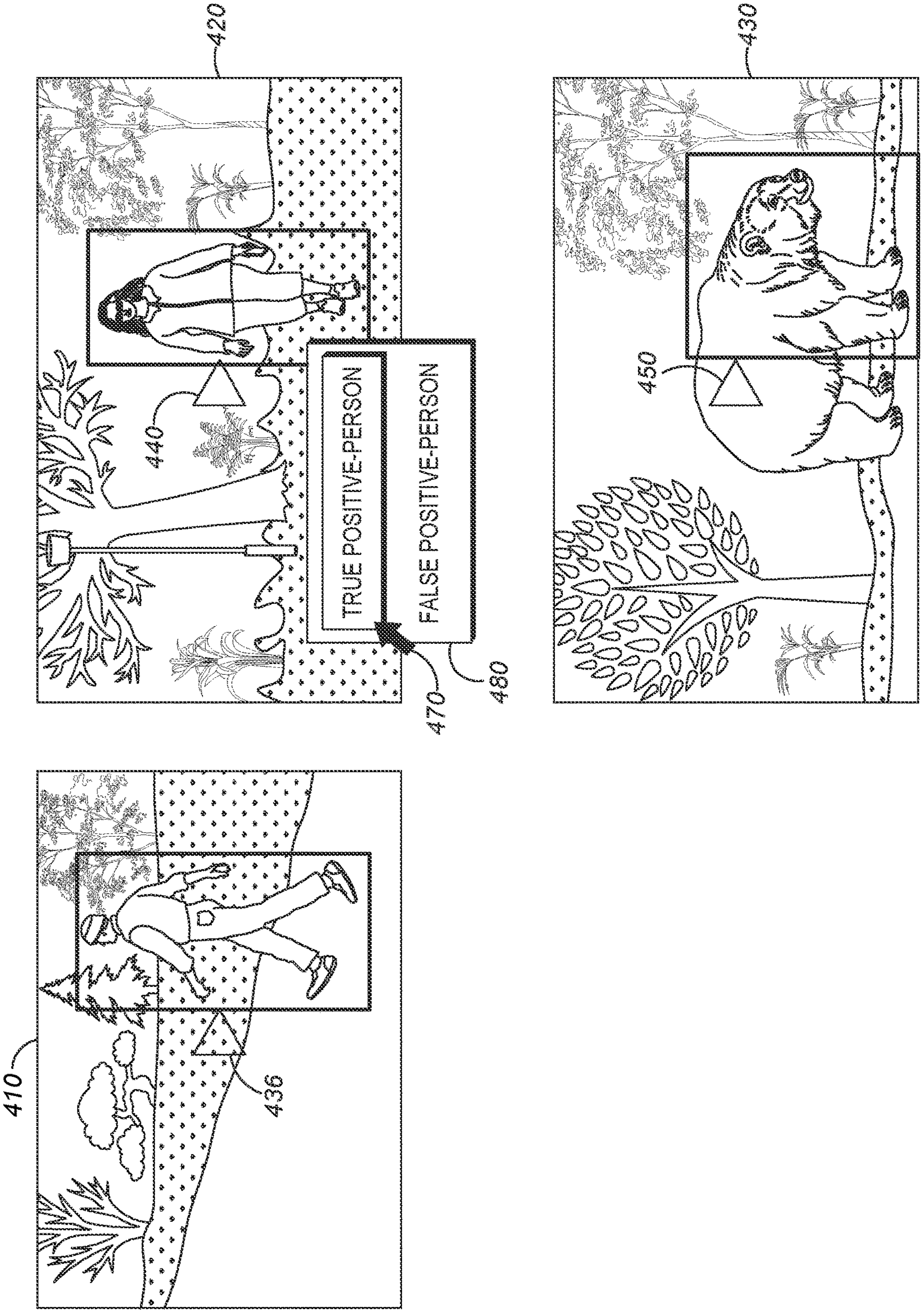
FIG. 6 is a diagram illustrating a second example user interaction with a representation of another playable video clip in accordance with the example embodiment of FIG. 4.
Figure 7:
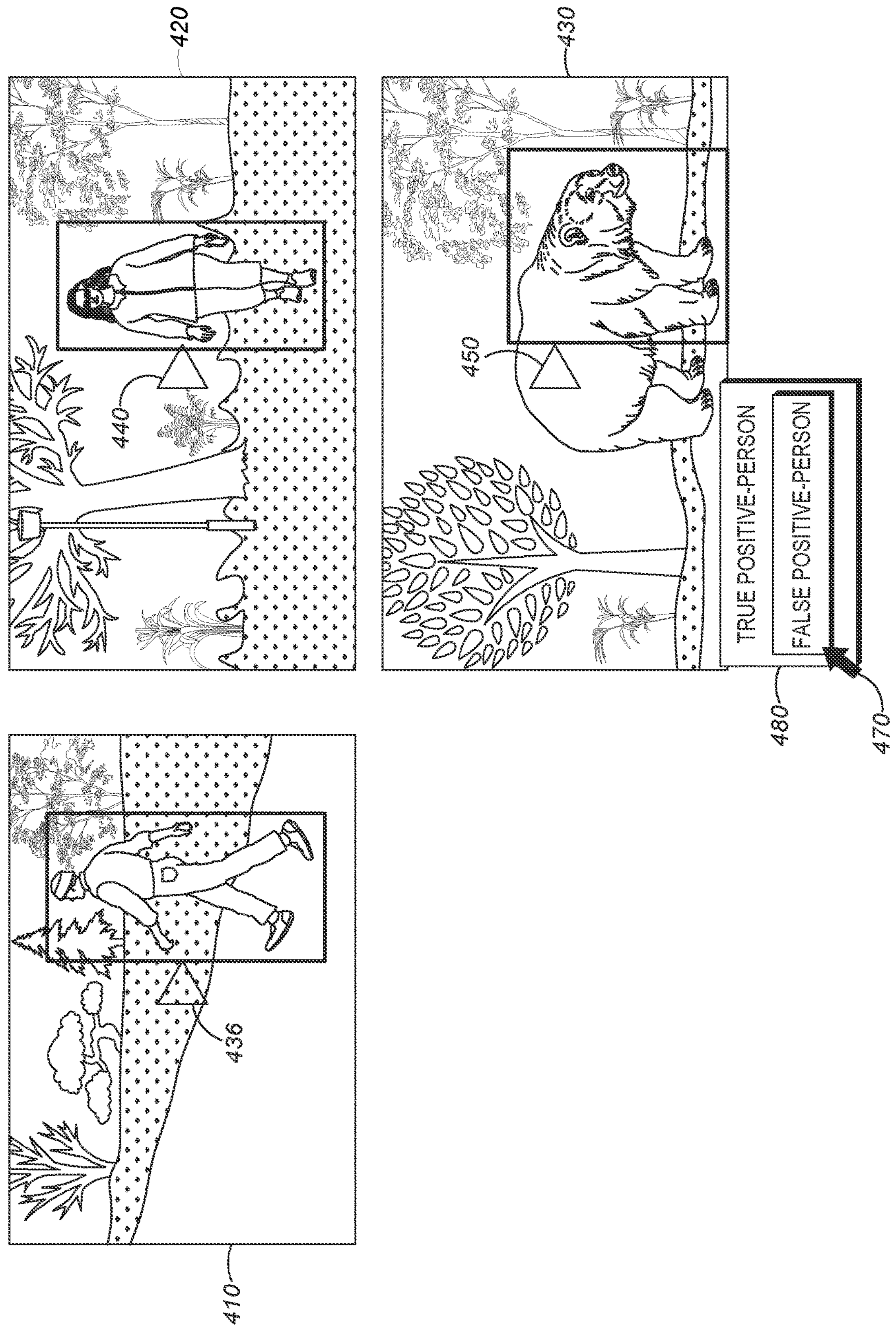
FIG. 7 is a diagram illustrating a third example user interaction with a representation of yet another playable video clip in accordance with the example embodiment of FIG. 4.

Continuing on, FIGS. 5 to 7 illustrate an example embodiment of the generating 320 described above. (The illustrated example embodiment is relating to three video clips but, as previously mentioned, any suitable size of bundling is contemplated.) As shown therein, each of video clips 410, 420 and 430 have a respective play icon (which is a specific example of a visual selection indicator). In particular, play icon 436 is user selectable (for example, using the user input device 182 such as a mouse, for instance) to play the video clip 410, play icon 440 is user selectable to play the video clip 420, and play icon 450 is user selectable to play the video clip 430. Also, those skilled in the art will appreciate that, in addition to the illustrated play icons, any suitable visual selection indicators are contemplated. The visual selection indicators need not be superimposed on top of the thumbnails as shown, For instance they may alternatively be present within another part of the user interface such as, for instance, within a timeline selection portion provided to search and play within longer recorded periods of video. Also, representations of the video clips need not necessarily be presented all together concurrently as shown. Other forms of presentations to the user, including sequential presentations, are contemplated.

Still with reference to the computer-implemented method 300 (FIG. 4), after the action 320 there is receiving (330), at the at least one electronic processor (such as, for example, any one or more of the CPU 172 and any other suitable electronic processor of the video capture and playback system 100 of FIG. 1), annotation input from the user that instructs each of the stored video clips to be digitally annotated as: i) a true positive for the first perceptible category; or ii) a false positive for the first perceptible category.

More details regarding the above are shown in FIGS. 5 to 7. In FIG. 5, the user right clicks on the video clip 410 of an elderly man walking down a road (for example, right clicking inside the area delineated by the bounding box associated with the elderly man) to generate a selection list 460 with the following selectable options: "FALSE POSITIVE-PERSON"; and "TRUE POSITIVE-PERSON".

Additional selectable options beyond the two that are illustrated within the selection list 460 are also contemplated. As one example, another selectable option might be "INDETERMINATE-PERSON". ("Indeterminate" may be anything that visually inhibits a user from arriving at a true or false decision such as, for example, a bad bounding box, both a correct and an incorrect object shown, etcetera. In some alternative examples, there may be no explicit "indeterminate" selection option. Instead the user may be allowed to, for example, skip annotating a particular video clip and this may be registered by the video analytics module 224 as being an indeterminate annotation from the user. Also, it is possible that the system may be configured to effectively ignore the "indeterminate" annotations, in the sense that they may cause no impact on re-bundling or re-clustering.)

Continuing on, within the selection list 460, the user clicks cursor 470 on the "TRUE POSITIVE-PERSON" selection. Thus, the video clip 410 showing the elderly man is digitally annotated as a true positive for a person detection.

Turning now to FIG. 6, the user right clicks on the video clip 420 of a woman with sunglasses through a park (for example, right clicking inside the area delineated by the bounding box associated with the woman) to generate a selection list 480. Then, within the selection list 480, the user clicks cursor 470 on the "TRUE POSITIVE-PERSON" selection. Thus, the video clip 420 showing the woman with sunglasses is digitally annotated as a true positive for a person detection.

Turning now to FIG. 7, the user right clicks on the video clip 430 of a bear (for example, right clicking inside the area delineated by the bounding box associated with the bear) to generate the selection list 480. Then, within the selection list 480, the user clicks cursor 470 on the "FALSE POSITIVE-PERSON" selection. Thus, the video clip 430 showing the bear is digitally annotated as a false positive for a person detection.

Finally, the computer-implemented method 300 includes changing (340), at an at least one electronic processor (such as, for example, any one or more of the CPU 172 and any other suitable electronic processor of the video capture and playback system 100 of FIG. 1) and based on the annotation input, criteria by which non-annotated detections are assigned or re-assigned to respective clusters (which may take the form of, for instance, re-clustering in which the membership within various clusters is changed vis-à-vis an increase or decrease in the number of detection instances with respect to which form the respective memberships). For example, in the context of the example embodiment shown and described in connection with FIGS. 5-7, the video analytics module 224 (FIGS. 2A and 2B) may be taught to alter criteria which may increase future likelihood that non-annotated detections similar to those annotated detections corresponding to the video clips 410 and 420 are grouped together in a similar or same category as the annotated detections. Similarly, the video analytics module 224 may be taught to alter criteria which may increase future likelihood that non-annotated detections similar to the annotated detection corresponding to the video clip 430 are grouped together in a large animal detection category.

Also, in some examples the video analytics module 224 may seek compound labelling annotation in relation to bundled or re-bundling video clips. For instance, certain objects (like, for example, a vehicle) can include one or more sub-objects (like, for example, a license plate), so examples of annotations in such case may include, for instance, "FALSE POSITIVE-CAR+LICENSE PLATE SHOWN", "TRUE POSITIVE-CAR+LICENSE PLATE SHOWN", "TRUE POSITIVE-CAR+LICENSE PLATE UNPERCEIVABLE", etcetera. Video clip annotation as herein shown and described may be in relation to one or more detections shown in each video clip, but it may also be in relation to alarms including those which may require more than a single image to be identified as such. For example, alarms such as object removed, object left behind, loitering, person entered through a door, person exited through a door, etcetera may be expected to require a user to look at more than a single image to properly complete a false positive annotation or a true positive annotation.

Video clip annotation as herein shown and described may be in relation to one or more detections shown in each video clip, but it may also be in relation to alarms including those which may require more than a single image to be identified as such. For example, alarms such as object removed, object left behind, loitering, person entered through a door, person exited through a door, etcetera may be expected to require a user to look at more than a single image to properly complete a false positive annotation or a true positive annotation.

As will be appreciated by those skilled in the art, the annotation data obtained as herein described (including as per the computer-implemented methods 268 and 300) is not necessarily limited in application to teach-by-example for a single one of the cameras 108. Instead the obtained annotation data can be applied to some plural number (or all) of other cameras within the video capture and playback system 100 or even cameras outside of it.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot cause bundled video clips and their respective representations to be graphically presented on a display device, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:

a display device;

at least one user input device; and an at least one electronic processor in communication with the display device and the at least one user input device, the at least one electronic processor configured to:

bundle a plurality of stored video clips together based on each video clip of the stored video clips, that includes a respective at least one object detection, being identified as potentially showing a first perceptible category of a plurality of perceptible categories;

identify that collectively both the stored video clips and an additional plurality of stored video clips form a group of video clips potentially showing the first perceptible category;

generate a plurality of visual selection indicators corresponding to the stored video clips to be presented to a user on the display device, each of the visual selection indicators operable to initiate playing of a respective one of the stored video clips;

receive, from the at least one user input device, annotation input from the user that instructs each of the stored video clips to be digitally annotated:

i) a true positive for the first perceptible category; or ii) a false positive for the first perceptible category; and based on the annotation input, change criteria by which non-annotated detections are assigned or re-assigned to respective clusters, wherein:

when the at least one electronic processor bundles the stored video clips together, a subset of the group that consists of the stored video clips is bundled and the additional stored video clips are excluded from being presented to the user for the annotation input, the video clips correspond to video captured by at least one video camera at a first security system site of a first customer, the display device is located at a second security system site of a second customer, the second customer is unrelated to the first customer, within the video clips one or more objects or one or more portions thereof are redacted by the at least one electronic processor based on privacy requirements, the annotation input is selectively structured as compound labelling annotation when the at least one object detection relates to an at least one object that includes at least one sub-object, and a value of unperceivable is permitted for a component of the compound labelling annotation corresponding to the at least one sub-object.

* * * * *